United States Patent
Ando

[11] Patent Number: 6,101,220
[45] Date of Patent: *Aug. 8, 2000

[54] METHOD AND APPARATUS FOR LIMITING BAND OF MOVING-PICTURE SIGNAL

[75] Inventor: Ichiro Ando, Yokosuka, Japan

[73] Assignee: Victor Company of Japan, Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/900,079

[22] Filed: Jul. 24, 1997

Related U.S. Application Data

[63] Continuation of application No. 08/571,054, Dec. 12, 1995, abandoned.

[30] Foreign Application Priority Data

Dec. 20, 1994 [JP] Japan .................................. 6-334674

[51] Int. Cl.⁷ ........................................ H04N 7/12
[52] U.S. Cl. .................................... 375/240; 348/415
[58] Field of Search ................................ 348/409–413, 348/415, 416, 699; H04N 7/12

[56] References Cited

U.S. PATENT DOCUMENTS

| | | | |
|---|---|---|---|
| 4,307,420 | 12/1981 | Ninomiya et al. | 348/413 |
| 4,933,763 | 6/1990 | Chantelou | 348/420 |
| 4,999,704 | 3/1991 | Ando | 348/401 |
| 5,043,810 | 8/1991 | Vreeswijk et al. | 348/413 |
| 5,067,015 | 11/1991 | Combridge et al. | 348/398 |
| 5,253,059 | 10/1993 | Ansari et al. | 348/390 |
| 5,253,075 | 10/1993 | Sugiyama | 358/261.2 |
| 5,317,397 | 5/1994 | Odaka et al. | 348/416 |
| 5,317,398 | 5/1994 | Casavant et al. | |
| 5,477,272 | 12/1995 | Zhang et al. | 348/407 |
| 5,519,456 | 5/1996 | Inamori | 348/699 |
| 5,543,848 | 8/1996 | Murakami et al. | 348/416 |
| 5,557,330 | 9/1996 | Astle | 348/394 |
| 5,565,920 | 10/1996 | Lee et al. | 348/398 |
| 5,576,767 | 11/1996 | Lee et al. | 348/413 |

FOREIGN PATENT DOCUMENTS

| | | |
|---|---|---|
| 0603878 | 6/1994 | European Pat. Off. . |
| 0614312 | 9/1994 | European Pat. Off. . |
| 51-114814 | 8/1976 | Japan . |
| 63-123291 | 5/1988 | Japan . |
| 2-171091 | 7/1990 | Japan . |

*Primary Examiner*—Young Lee
*Attorney, Agent, or Firm*—Lowe Hauptman Gopstein Gilman & Berner

[57] ABSTRACT

A motion-compensated predictive error signal is generated in response to a moving-picture signal for every frame related to the moving-picture signal. Calculation is made as to an activity for each of pixels composing the frame in response to the motion-compensated predictive error signal. The activities for the respective pixels composing the frame are accumulated to calculate a 1-frame activity accumulation value. A band of the moving-picture signal in at least one of a spatial direction and a temporal direction is limited with a controllable band limiting characteristic. The controllable band limiting characteristic is controlled in response to the activity for each of the pixels and the 1-frame activity accumulation value.

5 Claims, 6 Drawing Sheets

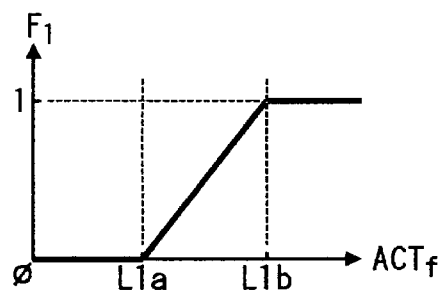
FIG. 5
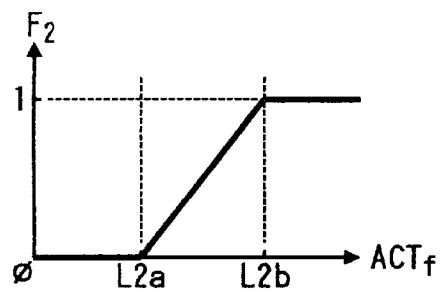
FIG. 6
FIG. 7
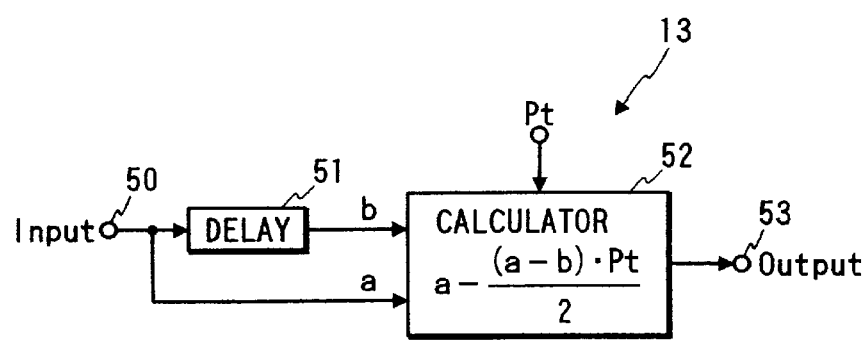

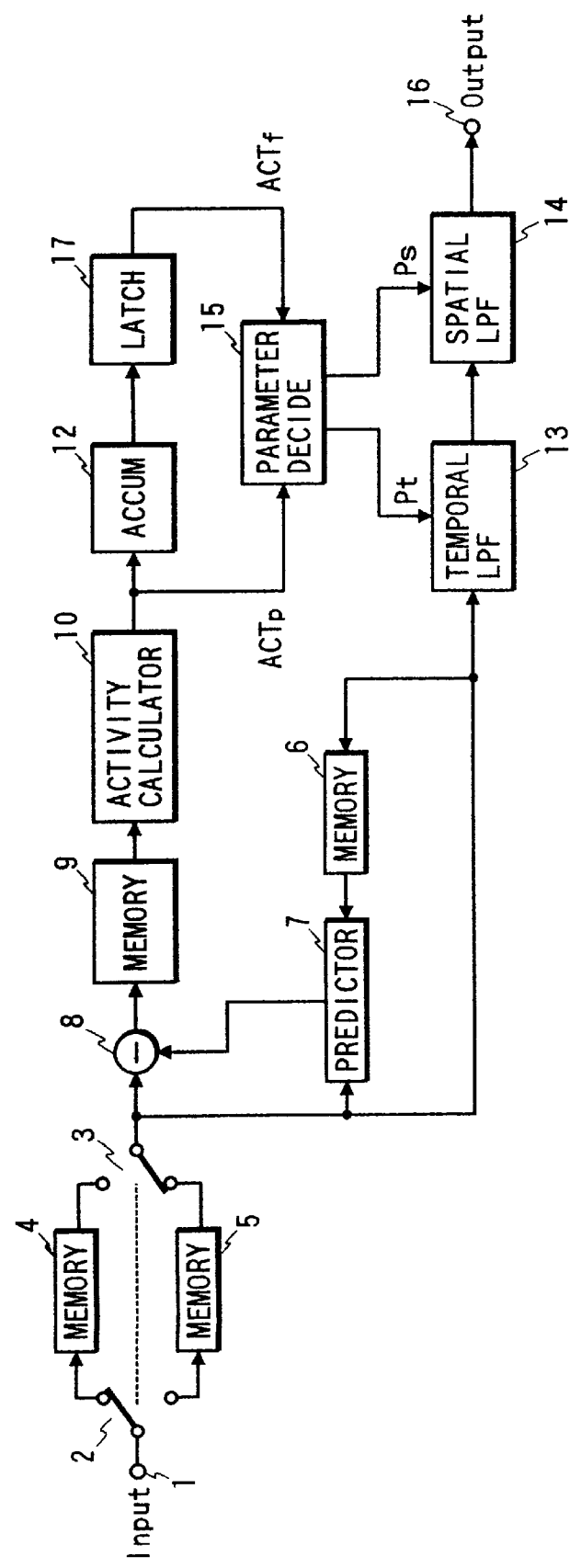

METHOD AND APPARATUS FOR LIMITING BAND OF MOVING-PICTURE SIGNAL

This application is a continuation of application Ser. No. 08/571,054 filed Dec. 12, 1995 abandoned.

BACKGROUND OF THE INVENTION

1. Field of the Invention

This invention relates to a method of limiting a band of a moving-picture signal. This invention also relates to an apparatus for limiting a band of a moving-picture signal.

2. Description of the Prior Art

Motion-compensated predictive encoding is one of highly-efficient encoding of a digital moving-picture signal. According to motion-compensated predictive encoding, every frame represented by a moving-picture signal is divided into blocks of a same size, and signal processing is executed block by block. Specifically, motion-compensated prediction is implemented by using a reference frame represented by picture data which results from decoding a previously-encoded frame. Calculation is given of a predictive error between a current block and a predicted block which results from the motion-compensated prediction. The predictive error is encoded. Thus, motion-compensated predictive encoding compresses a moving-picture signal by using a temporal correlation between successive frames represented by the moving-picture signal.

According to a typical type of the encoding of a predictive error, the predictive error is subjected to orthogonal transform, and a signal which results from the orthogonal transform is quantized. Further, a quantization-resultant signal is subjected to an entropy encoding process. Thus, the typical type of the encoding of a predictive error compresses picture information by using a spatial correlation and a statistical correlation in a moving picture.

In general, a temporal correlation, a spatial correlation, and a statistical correlation considerably vary from picture to picture. On the other hand, an amount of data (the number of bits of data) generated by encoding per unit time, that is, an encoding-resultant-data rate, is generally required to be a constant value independent of the contents of a moving picture. To meet such a requirement, the characteristics of quantization are changed in response to the characteristics of a moving picture.

Specifically, in the case of pictures related to high temporal, spatial, and statistical correlations, fine quantization is executed to increase an encoding-resultant-data rate (the number of bits of data generated by encoding per unit time) to a desired rate. In the case of pictures related to low temporal, spatial, and statistical correlations, coarse quantization is executed to decrease an encoding-resultant-data rate (the number of bits of data generated by encoding per unit time) to the desired rate.

In general, an encoding side and a decoding side are connected via a transmission line. The decoding side receives the output signal of the encoding side via the transmission line, and recovers an original moving-picture signal by decoding the output signal of the encoding side. Quantization at the encoding side causes a quantization distortion in every picture represented by the moving-picture signal recovered at the decoding side. The quantization distortion appears in the form of noise referred to as mosquito noise or block noise.

According to a prior-art method designed to solve such a noise problem, temporal and spatial correlations in moving pictures are measured on the basis of an inter-frame difference (an inter-frame error) at a stage preceding a compressively encoding section, and signal bands in a temporal direction (a direction along a time base) and a spatial direction are limited in response to information of the measured correlations. The prior-art method disregards a temporal redundancy in moving pictures which is generally removed by motion-compensated prediction. Thus, in given signal conditions, the prior-art method needlessly limits the signal bands.

SUMMARY OF THE INVENTION

It is a first object of this invention to provide an improved method of limiting a band of a moving-picture signal.

It is a second object of this invention to provide an improved apparatus for limiting a band of a moving-picture signal.

A first aspect of this invention provides a method of limiting a band of a moving-picture signal which comprises the steps of generating a motion-compensated predictive error signal in response to the moving-picture signal for every frame related to the moving-picture signal; calculating an activity for each of pixels composing the frame in response to the motion-compensated predictive error signal; accumulating the activities for the respective pixels composing the frame to calculate a 1-frame activity accumulation value; limiting the band of the moving-picture signal in at least one of a spatial direction and a temporal direction with a controllable band limiting characteristic; and controlling the controllable band limiting characteristic in response to the activity for each of the pixels and the 1-frame activity accumulation value.

A second aspect of this invention is based on the first aspect thereof, and provides a method wherein a frame related to the moving-picture signal which is currently band-limited is equal to a frame related to the 1-frame activity accumulation value currently used in said controlling the controllable band limiting characteristic.

A third aspect of this invention is based on the first aspect thereof, and provides a method wherein a frame related to the moving-picture signal which is currently band-limited follows a frame related to the 1-frame activity accumulation value currently used in said controlling the controllable band limiting characteristic.

A fourth aspect of this invention provides an apparatus for limiting a band of a moving-picture signal which comprises first means for generating a motion-compensated predictive error signal in response to the moving-picture signal for every frame related to the moving-picture signal; second means connected to the first means for calculating an activity for each of pixels composing the frame in response to the motion-compensated predictive error signal; third means connected to the second means for accumulating the activities for the respective pixels composing the frame to calculate a 1-frame activity accumulation value: fourth means for limiting the band of the moving-picture signal in at least one of a spatial direction and a temporal direction with a controllable band limiting characteristic; and fifth means connected to the second means, the third means, and the fourth means for controlling the controllable band limiting characteristic in response to the activity for each of the pixels and the 1-frame activity accumulation value.

A fifth aspect of this invention is based on the fourth aspect thereof, and provides an apparatus wherein a frame related to the moving-picture signal which is currently band-limited is equal to a frame related to the 1-frame activity accumulation value currently used in said controlling the controllable band limiting characteristic.

A sixth aspect of this invention is based on the fourth aspect thereof, and provides an apparatus wherein a frame related to the moving-picture signal which is currently band-limited follows a frame related to the 1-frame activity accumulation value currently used in said controlling the controllable band limiting characteristic.

BRIEF DESCRIPTION OF THE DRAWINGS

FIG. 5 is a diagram of the relation between the values represented by an input signal and an output signal with respect to a ROM in FIG. 4.

FIG. 6 is a diagram of the relation between the values represented by an input signal and an output signal with respect to another ROM in FIG. 4.

FIG. 7 is a block diagram of a temporal-direction low pass filter in FIG. 1.

FIG. 9 is a block diagram of a band limiting apparatus according to a second embodiment of this invention.

DESCRIPTION OF THE PREFERRED EMBODIMENTS

First Embodiment

Figure 1:
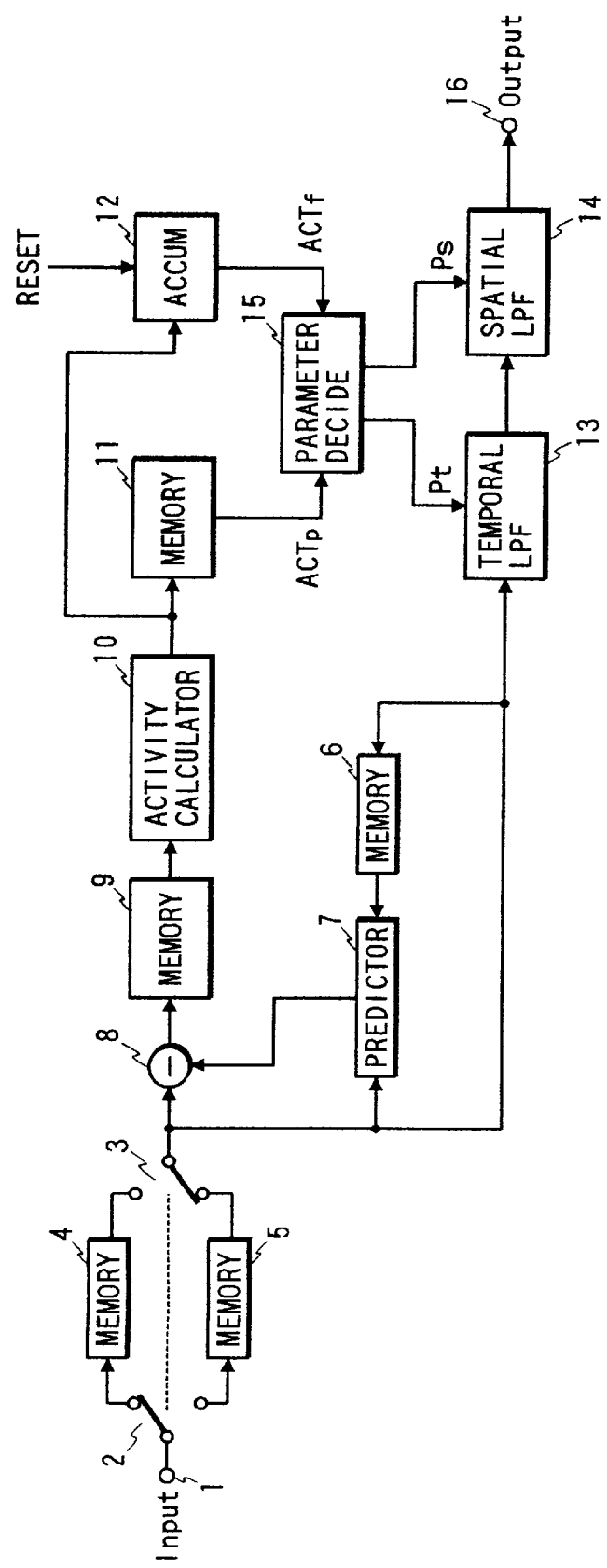
FIG. 1 is a block diagram of a band limiting apparatus according to a first embodiment of this invention.

With reference to FIG. 1, a band limiting apparatus includes an input terminal 1 subjected to an input digital signal sequentially representing moving pictures. The apparatus input terminal 1 is followed by a switch 2. The switch 2 is connected to memories 4 and 5. The switch 2 receives the input moving-picture signal from the apparatus input terminal 1, and transmits the input moving-picture signal to either the memory 4 or the memory 5. The switch 2 responds to a switch control signal fed from a suitable signal generator (not shown). The switch control signal changes between different states in synchronism with a frame related to the input moving-picture signal. Accordingly, the switch 2 alternately transmits the input moving-picture signal to one of the memories 4 and 5 at a given period corresponding to a frame period. The input moving-picture signal related to each of first alternate frames is stored into the memory 4 while the input moving-picture signal related to each of second alternate frames is stored into the memory 5. The moving-picture signals are temporarily held in the memories 4 and 5 before being outputted or read out therefrom.

A switch 3 follows the memories 4 and 5. The switch 3 transmits one of the output signals of the memories 4 and 5 to a later stage. The switch 3 responds to the switch control signal. Accordingly, the switch 3 alternately transmits one of the output signals of the memories 4 and 5 to a later stage at a given period corresponding to the frame period.

Operation of the memories 4 and 5 will be further described. During each of first alternate 1-frame periods, the input moving-picture signal is written into the memory 4 via the switch 2 while the moving-picture signal is read out and transmitted from the memory 5 via the switch 3. During each of second alternate 1-frame periods, the input moving-picture signal is written into the memory 5 via the switch 2 while the moving-picture signal is read out and transmitted from the memory 4 via the switch 3.

The moving-picture signal transmitted via the switch 3 travels to a memory 6, a predictor 7, and a subtracter 8. The memory 6 serves as a 1-frame delay device. Specifically, the moving-picture signal transmitted via the switch 3 is stored into the memory 6 before being temporarily held therein. Then, the moving-picture signal is outputted from the memory 6 as a 1-frame-preceding moving-picture signal related to an immediately-preceding frame with respect to the current frame, that is, a frame represented by the moving-picture signal currently transmitted via the switch 3.

The predictor 7 receives the moving-picture signal from the switch 3 as a current-fame moving-picture signal. The predictor 7 receives the output signal of the memory 6 as a 1-frame-preceding moving-picture signal. The predictor 7 uses the 1-frame-preceding moving-picture signal as a reference-frame moving-picture signal, and generates a motion-compensated predictive picture signal in response to the current-frame moving-picture signal and the reference-frame moving-picture signal. The predictor 7 outputs the motion-compensated predictive picture signal to the subtracter 8.

The signal processing implemented by the predictor 7 is based on one of known motion-compensated prediction techniques such as a technique using motion vectors detected by block matching.

The subtracter 8 receives the moving-picture signal via the switch 3. The subtracter 8 receives the motion-compensated predictive picture signal from the predictor 7. The subtracter 8 calculates a difference between the moving-picture signal received via the switch 3 and the motion-compensated predictive picture signal, thereby generating a first motion-compensated predictive error signal corresponding to the calculated difference. The subtracter 8 outputs the first motion-compensated predictive error signal to a memory 9.

The first motion-compensated predictive error signal is stored into the memory 9 before being temporarily held therein and outputted therefrom as a second motion-compensated predictive error signal. In the case where the signal processing implemented by the predictor 7 is based on a motion-compensated prediction technique using motion vectors detected by block matching, every frame is divided into blocks of a given size, and a motion-compensated prediction error signal is processed block by block. In this case, to simplify signal processing executed by a later stage, the memory 9 is preferably used as a scan converter to enable the recovery of a signal-piece sequence equal to a normal scanning-line sequence. The memory 9 feeds the second motion-compensated predictive error signal to an activity calculator 10.

The device 10 calculates the activity of every pixel-corresponding segment of the second motion-compensated predictive error signal. The activity calculator 10 outputs a signal representative of the calculated activity to a memory 11 and an accumulator (or an integrator) 12.

Figure 2:
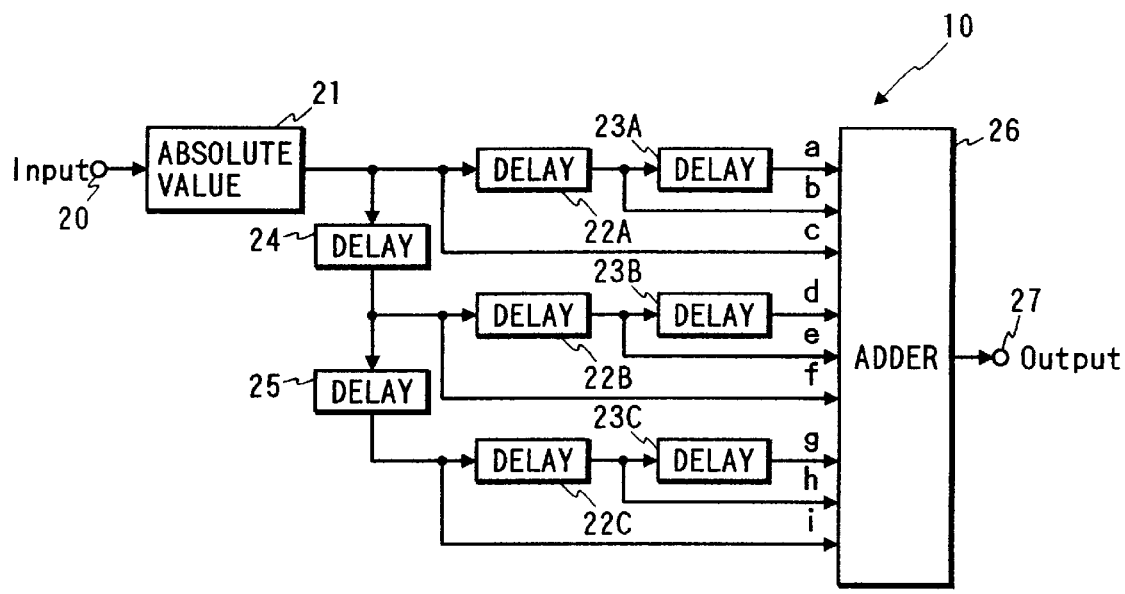
FIG. 2 is a block diagram of an activity calculator in FIG. 1.

FIG. 2 shows an example of the activity calculator 10. As shown in FIG. 2, the activity calculator 10 includes an input terminal 20, an absolute-value calculator 21, delay devices 22A, 22B, 22C, 23A, 23B, 23C, 24, and 25, an adder 26, and an output terminal 27.

In the activity calculator 10 of FIG. 2, the input terminal 20 is subjected to the second motion-compensated predictive error signal. The input terminal 20 is followed by the absolute-value calculator 21. The second motion-compensated predictive error signal is transmitted via the input terminal 20 to the absolute-value calculator 21. The device 21 calculates the absolute value of the value represented by every pixel-corresponding segment of the second motion-compensated predictive error signal. The absolute-value calculator 21 generates and outputs a signal "c" representing the calculated absolute-value. The output signal "c" of the absolute-value calculator 21 is applied to the delay devices 22A and 24 and the adder 26.

The device 22A delays the signal "c" by a period corresponding to one pixel, and thereby changes the signal "c" into a delay-resultant signal "b". The delay device 22A outputs the signal "b" to the delay device 23A and the adder 26. The device 23A delays the signal "b" by a period corresponding to one pixel, and thereby changes the signal "b" into a delay-resultant signal "a". The delay device 23A outputs the signal "a" to the adder 26.

The device 24 delays the signal "c" by a period corresponding to one scanning line, and thereby changes the signal "c" into a delay-resultant signal "f". The delay device 24 outputs the signal "f" to the delay device 22B, the delay device 25, and the adder 26. The device 22B delays the signal "f" by a period corresponding to one pixel, and thereby changes the signal "f" into a delay-resultant signal "e". The delay device 22B outputs the signal "e" to the delay device 23B and the adder 26. The device 23B delays the signal "e" by a period corresponding to one pixel, and thereby changes the signal "e" into a delay-resultant signal "d". The delay device 23B outputs the signal "d" to the adder 26.

The device 25 delays the signal "f" by a period corresponding to one scanning line, and thereby changes the signal "f" into a delay-resultant signal "i". The delay device 25 outputs the signal "i" to the delay device 22C and the adder 26. The device 22C delays the signal "i" by a period corresponding to one pixel, and thereby changes the signal "i" into a delay-resultant signal "h". The delay device 22C outputs the signal "h" to the delay device 23C and the adder 26. The device 23C delays the signal "h" by a period corresponding to one pixel, and thereby changes the signal "h" into a delay-resultant signal "g". The delay device 23C outputs the signal "g" to the adder 26.

Figure 3:
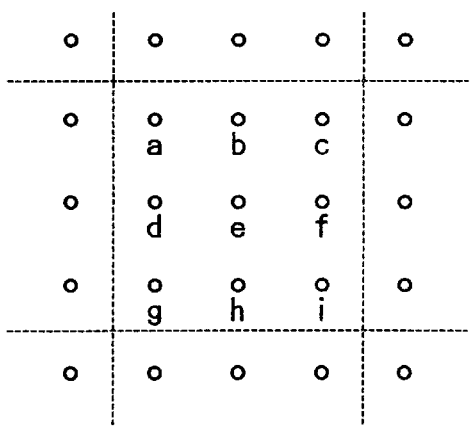
FIG. 3 is a diagram of an array of pixels.

With reference to FIG. 3, 3×3 neighboring pixels "a", "b", "c", "d", "e", "f", "g", "h", and "i" are defined in connection with the signals "a", "b", "c", "d", "e", "f", "g", "h", and "i" in the activity calculator 10 of FIG. 2, respectively. Specifically, the signal "e" represents the calculated absolute-value of the value represented by the segment of the second motion-compensated predictive error signal which corresponds to the central pixel "e", that is, the pixel of interest or the pixel in question. The signal "a" represents the calculated absolute-value of the value represented by the segment of the second motion-compensated predictive error signal which corresponds to the left-upper pixel "a". The signal "b" represents the calculated absolute-value of the value represented by the segment of the second motion-compensated predictive error signal which corresponds to the mid-upper pixel "b". The signal "c" represents the calculated absolute-value of the value represented by the segment of the second motion-compensated predictive error signal which corresponds to the right-upper pixel "c". The signal "d" represents the calculated absolute-value of the value represented by the segment of the second motion-compensated predictive error signal which corresponds to the left pixel "d" in the intermediate line. The signal "f" represents the calculated absolute-value of the value represented by the segment of the second motion-compensated predictive error signal which corresponds to the right pixel "f" in the intermediate line. The signal "g" represents the calculated absolute-value of the value represented by the segment of the second motion-compensated predictive error signal which corresponds to the left-lower pixel "g". The signal "h" represents the calculated absolute-value of the value represented by the segment of the second motion-compensated predictive error signal which corresponds to the mid-lower pixel "h". The signal "i" represents the calculated absolute-value of the value represented by the segment of the second motion-compensated predictive error signal which corresponds to the right-lower pixel "i".

In the activity calculator 10 of FIG. 2, the device 26 adds the absolute values represented by the signals "a", "b", "c", "d", "e", "f", "g", "h", and "i". In other words, the adder 26 calculates the sum of the absolute values represented by the signals "a", "b", "c", "d", "e", "f", "g", "h", and "i". The calculated sum of the absolute values is defined as an activity corresponding to the pixel "e" of interest. Accordingly, the adder 26 generates and outputs a signal representing the activity of every pixel-corresponding segment of the second motion-compensated predictive error signal. The activity-representing signal is transmitted from the adder 26 to the memory 11 (see FIG. 1) and the accumulator 12 (see FIG. 1) via the output terminal 27.

The signal processing executed by the activity calculator 10 includes a step of subjecting the second motion-compensated predictive error signal of the pixel "e" of interest to a low pass filtering process in spatial directions. Accordingly, the activity calculated by the device 10 results from the low pass filtering process. The low pass filtering process suppresses a local increase in the second motion-compensated predictive error signal which would be caused by, for example, noise in the input moving-picture signal.

With reference back to FIG. 1, the activity-representing signal corresponding to every pixel is stored into the memory 11 from the activity calculator 10. In addition, the activity-representing signal corresponding to every pixel is inputted into the accumulator 12. The generation of the first motion-compensated predictive error signal and the calculation of the pixel-corresponding activity continue to be repeated until the activity-representing signals corresponding to respective pixels composing one frame (the currently processed frame) are stored into the memory 11 and are inputted into the accumulator 12.

The accumulator 12 is informed of the activities represented by the activity-representing signals. The accumulator 12 adds or accumulates the activities into the accumulation value. The accumulator 12 responds to a frame sync signal fed from a suitable signal generator (not shown). The frame sync signal serves as a reset signal. Each time the signal processing for one frame has been completed, the accumulation value calculated by the accumulator 12 is reset to "0". Specifically, the accumulator 12 calculates the sum of the activities corresponding to the respective pixels composing one frame (the currently processed frame). The calculated sum of the activities is referred to as the 1-frame activity accumulation value ACTf. The accumulator 12 generates a signal representing the 1-frame activity accumulation value ACTf. The accumulator 12 outputs the generated signal to a parameter deciding device 15.

The activity-representing signals corresponding to respective pixels composing one frame (the currently processed frame) are sequentially read out from the memory 11 and are then fed to the parameter deciding device 15. The pixel-corresponding activity represented by every activity-representing signal read out from the memory 11 is denoted by the character "ACTp". The activity ACTp represented by the output signal of the memory 11 relates to a pixel within a frame corresponding to the 1-frame activity accumulation value ACTf represented by the output signal of the accumulator 12.

The parameter deciding device 15 is informed of the 1-frame activity accumulation value ACTf represented by the output signal of the accumulator 12. The parameter deciding device 15 is informed of the pixel-corresponding activity ACTp represented by the activity-representing signal fed from the memory 11. The parameter deciding device 15 determines a band limit control parameter Pt for a temporal-direction low pass filter 13 and a band limit control parameter Ps for a spatial-direction low pass filter 14 in response to the 1-frame activity accumulation value ACTf and the pixel-corresponding activity ACTp.

The temporal-direction low pass filter 13 and the spatial-direction low pass filter 14 are of variable types. The temporal-direction low pass filter 13, the spatial-direction low pass filter 14, and the band limit control parameters Pt and Ps are designed to provide the following functions. When the band limit control parameter Pt is equal to "0", the temporal-direction low pass filter 13 assumes a through state and hence does not execute any low pass filtering function. When the band limit control parameter Pt is equal to "1", the temporal-direction low pass filter 13 fully executes a given low pass filtering function. When the band limit control parameter Pt is equal to a value between "0" and "1", the temporal-direction low pass filter 13 executes the low pass filtering function at a degree corresponding to the value of the band limit control parameter Pt. When the band limit control parameter Ps is equal to "0", the spatial-direction low pass filter 14 assumes a through state and hence does not execute any low pass filtering function. When the band limit control parameter Ps is equal to "1", the spatial-direction low pass filter 14 fully executes a given low pass filtering function. When the band limit control parameter Ps is equal to a value between "0" and "1", the spatial-direction low pass filter 14 executes the low pass filtering function at a degree corresponding to the value of the band limit control parameter Ps.

Figure 4:
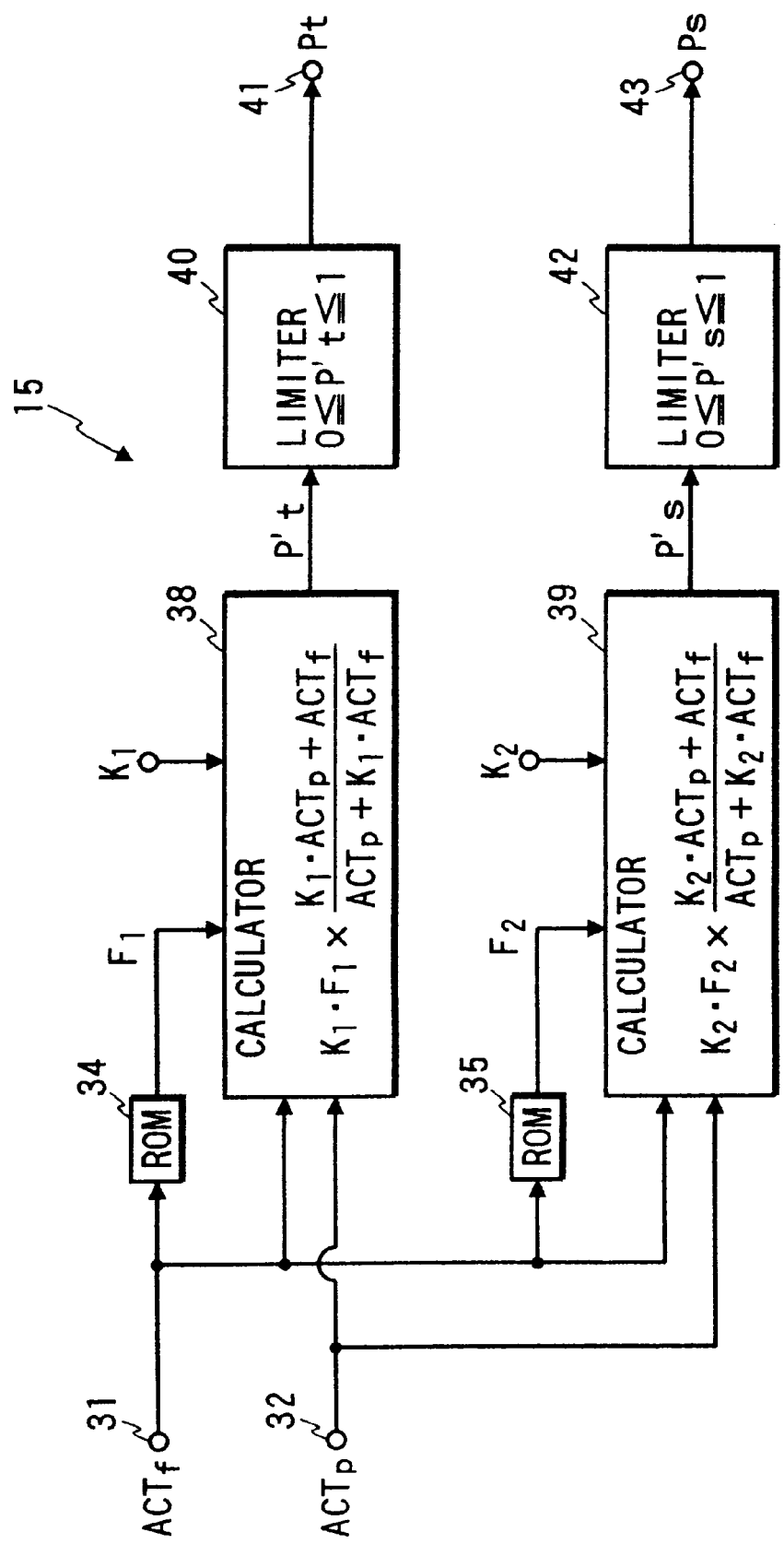
FIG. 4 is a block diagram of a parameter deciding device in FIG. 1.

FIG. 4 shows an example of the parameter deciding device 15. As shown in FIG. 4, the parameter deciding device 15 includes input terminals 31 and 32, ROM's 34 and 35, calculators 38 and 39, limiters 40 and 42, and output terminals 41 and 43.

In the parameter deciding device 15 of FIG. 4, the input terminal 31 is subjected to the output signal of the accumulator 12 (see FIG. 1) which represents the 1-frame activity accumulation value ACTf. The signal representing the 1-frame activity accumulation value ACTf is applied via the input terminal 31 to an address input terminal of the ROM 34, an address input terminal of the ROM 35, and the calculators 38 and 39.

The ROM 34 serves as a signal converter or a function generator. The ROM 34 outputs a signal representative of a value F1 in response to the signal representing the 1-frame activity accumulation value ACTf. Specifically, the ROM 34 stores preset signals representative of values F1 at storage segments having different addresses respectively. The signal representing the 1-frame activity accumulation value ACTf serves as an address signal applied to the ROM 34. One of the storage segments of the ROM 34 is accessed in response to the address signal, that is, the signal representing the 1-frame activity accumulation value ACTf. A signal representative of a value F1 is read out or outputted from the accessed storage segment of the ROM 34. It is shown in FIG. 5 that the value F1 represented by the output signal of the ROM 34 linearly increases from "0" to "1" as the 1-frame activity accumulation value ACTf increases from a first given value L1a to a second given value L1b. The value F1 is "0" when the 1-frame activity accumulation value ACTf is smaller than the first given value L1a. The value F1 is "1" when the 1-frame activity accumulation value ACTf is greater than the second given value L1b. The output signal of the ROM 34 is applied to the calculator 38.

In the parameter deciding device 15 of FIG. 4, the input terminal 32 is subjected to the output signal of the memory 11 (see FIG. 1) which represents the pixel-corresponding activity ACTp. The signal representing the pixel-corresponding activity ACTp is applied via the input terminal 32 to the calculators 38 and 39.

The calculator 38 determines a basic band limit control parameter Pt' in response to the value F1, a preset value K1, the 1-frame activity accumulation value ACTf, and the pixel-corresponding activity ACTp according to the following equation.

$$Pt' = K1 \cdot F1 \times \frac{K1 \cdot ACTp + ACTf}{ACTp + K1 \cdot ACTf}$$

Here, the preset value K1 is greater than "1". When the pixel-corresponding activity ACTp is equal to "0", the basic band limit control parameter Pt' is equal to the value F1. When the pixel-corresponding activity ACTp is infinite, the basic band limit control parameter Pt' is equal to the value "K1·K1·F1". In the case where the value F1 is greater than "0", the basic band limit control parameter Pt' increases as the pixel-corresponding activity ACTp increases. Further, in the case where the 1-frame activity accumulation value ACTf is smaller than the first given value L1a, the value F1 is "0" as previously described so that the basic band limit control parameter Pt' is also "0". On the other hand, in the case where the 1-frame activity accumulation value ACTf is greater than the second given value L1b, the value F1 is "1" as previously described so that the basic band limit control parameter Pt' is equal to or greater than "1". The calculator 38 informs the limiter 40 of the basic band limit control parameter Pt'.

The signal conversion executed by the ROM 34 is designed to disregard a variation in the value F1 which would be caused by a variation in the value ACTf due to small noise. In addition, the signal conversion executed by the ROM 34 is designed to prevent an excessive increase in the width of data outputted from the ROM 34 which would be caused by an increase in the value F1 above "1" due to an increase in the value ACTf.

The limiter 40 changes the basic band limit control parameter Pt' into the final band limit control parameter Pt by a limiting process. Specifically, when the basic band limit control parameter Pt' is smaller than or equal to "1", the limiter 40 sets the final band limit control parameter Pt equal to the basic band limit control parameter Pt'. When the basic band limit control parameter Pt' is greater than "1", the limiter 40 sets the final band limit control parameter Pt equal to "1". Operation of the limiter 40 is designed to meet a requirement for the variable range of the final band limit control parameter Pt and also to prevent an excessive increase in the width of data outputted from the limiter 40.

The limiter 40 outputs a signal representing the final band limit control parameter Pt. The signal representing the final band limit control parameter Pt is transmitted from the limiter 40 to the temporal-direction low pass filter 13 (see FIG. 1) via the output terminal 41.

The first given value L1a, the second given value L1b, and the preset value K1 determine the sensitivity of the final band limit control parameter Pt with respect to the input activity.

The ROM 35 serves as a signal converter or a function generator. The ROM 35 outputs a signal representative of a value F2 in response to the signal representing the 1-frame activity accumulation value ACTf. Specifically, the ROM 35 stores preset signals representative of values F2 at storage segments having different addresses respectively. The signal representing the 1-frame activity accumulation value ACTf serves as an address signal applied to the ROM 35. One of the storage segments of the ROM 35 is accessed in response to the address signal, that is, the signal representing the 1-frame activity accumulation value ACTf. A signal representative of a value F2 is read out or outputted from the accessed storage segment of the ROM 35. It is shown in FIG. 6 that the value F2 represented by the output signal of the ROM 35 linearly increases from "0" to "1" as the 1-frame activity accumulation value ACTf increases from a first given value L2a to a second given value L2b. The value F2 is "0" when the 1-frame activity accumulation value ACTf is smaller than the first given value L2a. The value F2 is "1" when the 1-frame activity accumulation value ACTf is greater than the second given value L2b. The output signal of the ROM 35 is applied to the calculator 39.

The calculator 39 determines a basic band limit control parameter Ps' in response to the value F2, a preset value K2, the 1-frame activity accumulation value ACTf, and the pixel-corresponding activity ACTp according to the following equation.

$$Ps' = K2 \cdot F2 \times \frac{K2 \cdot ACTp + ACTf}{ACTp + K2 \cdot ACTf}$$

Here, the preset value K2 is greater than "1". It is preferable that the preset value K2 differs from the preset value K1. The preset value K2 may be equal to the preset value K1. When the pixel-corresponding activity ACTp is equal to "0", the basic band limit control parameter Ps' is equal to the value F2. When the pixel-corresponding activity ACTp is infinite, the basic band limit control parameter Ps' is equal to the value "K2·K2·F2". In the case where the value F2 is greater than "0", the basic band limit control parameter Ps' increases as the pixel-corresponding activity ACTp increases. Further, in the case where the 1-frame activity accumulation value ACTf is smaller than the first given value L2a, the value F2 is "0" as previously described so that the basic band limit control parameter Ps' is also "0". On the other hand, in the case where the 1-frame activity accumulation value ACTf is greater than the second given value L2b, the value F2 is "1" as previously described so that the basic band limit control parameter Ps' is equal to or greater than "1". The calculator 39 informs the limiter 42 of the basic band limit control parameter Ps'.

The signal conversion executed by the ROM 35 is designed to disregard a variation in the value F2 which would be caused by a variation in the value ACTf due to small noise. In addition, the signal conversion executed by the ROM 35 is designed to prevent an excessive increase in the width of data outputted from the ROM 35 which would be caused by an increase in the value F2 above "1" due to an increase in the value ACTf.

The limiter 42 changes the basic band limit control parameter Ps' into the final band limit control parameter Ps by a limiting process. Specifically, when the basic band limit control parameter Ps' is smaller than or equal to "1", the limiter 42 sets the final band limit control parameter Ps equal to the basic band limit control parameter Ps'. When the basic band limit control parameter Ps' is greater than "1", the limiter 42 sets the final band limit control parameter Ps equal to "1". Operation of the limiter 42 is designed to meet a requirement for the variable range of the final band limit control parameter Ps and also to prevent an excessive increase in the width of data outputted from the limiter 42. The limiter 42 outputs a signal representing the final band limit control parameter Ps. The signal representing the final band limit control parameter Ps is transmitted from the limiter 42 to the spatial-direction low pass filter 14 (see FIG. 1) via the output terminal 43.

The first given value L2a, the second given value L2b, and the preset value K2 determine the sensitivity of the final band limit control parameter Ps with respect to the input activity.

With reference back to FIG. 1, the temporal-direction low pass filter 13 receives the moving-picture signal via the switch 3. The device 13 subjects the received moving-picture signal to a temporal-direction low pass filtering process responsive to the band limit control parameter Pt represented by the output signal of the parameter deciding device 15.

FIG. 7 shows an example of the temporal-direction low pass filter 13. As shown in FIG. 7, the temporal-direction low pass filter 13 includes an input terminal 50, a delay device 51, a calculator 52, and an output terminal 53.

In the temporal-direction low pass filter 13 of FIG. 7, the input terminal 50 is subjected to the moving-picture signal transmitted via the switch 3 (see FIG. 1). The input terminal 50 is connected to the delay device 51 and the calculator 52. The moving-picture signal is fed from the input terminal 50 to the delay device 51 and the calculator 52. The device 51 delays the moving-picture signal by a period corresponding to one frame. The delay device 51 outputs the delay-resultant signal to the calculator 52. The moving-picture signal fed from the input terminal 50 to the calculator 52 represents a value "a" at a pixel in the current frame. The output signal of the delay device 51 represents a value "b" at the same pixel in the immediately preceding frame. The calculator 52 is informed of the values "a" and "b". Further, the calculator 52 is informed of the band limit control parameter Pt. The calculator 52 determines a filtering-result value St in response to the value "a", the value "b", and the band limit control parameter Pt according to the following equation.

$$St = a - \frac{(a - b) \cdot Pt}{2}$$

This equation corresponds to a low pass filtering process in a temporal direction. The degree of the low pass filtering process depends on the band limit control parameter Pt. The calculator 52 generates a signal representing the filtering-result value St. The signal representing the filtering-result value St is transmitted from the calculator 52 to the spatial-direction low pass filter 14 (see FIG. 1) via the output terminal 53 as a first filtering-resultant moving-picture signal.

When the band limit control parameter Pt is equal to "0", the filtering-result value St is equal to the value "a". In this case, the temporal-direction low pass filter 13 is in a through state so that the moving-picture signal passes through the temporal-direction low pass filter 13 without undergoing any filtering process. When the band limit control parameter Pt is equal to "1", the filtering-result value St is equal to the value "(a+b)/2" which agrees with a mean between the pixel values "a" and "b" related to the current frame and the immediately preceding frame. In this case, the temporal-direction low pass filter 13 fully executes a given low pass filtering process in a temporal direction. When the band limit control parameter Pt is equal to a value between "0" and "1", the filtering-result value St is equal to a weighted mean between the values "a" and "b". In this case, weighting coefficients for the values "a" and "b" depend on the band limit control parameter Pt, and the temporal-direction low pass filter 13 executes the temporal-direction low pass filtering process at a degree depending on the band limit control parameter Pt.

With reference back to FIG. 1, the spatial-direction low pass filter 14 receives the first filtering-resultant moving-picture signal from the temporal-direction low pass filter 13. The device 14 subjects the first filtering-resultant moving-picture signal to a spatial-direction low pass filtering process responsive to the band limit control parameter Ps represented by the output signal of the parameter deciding device 15.

Figure 8:
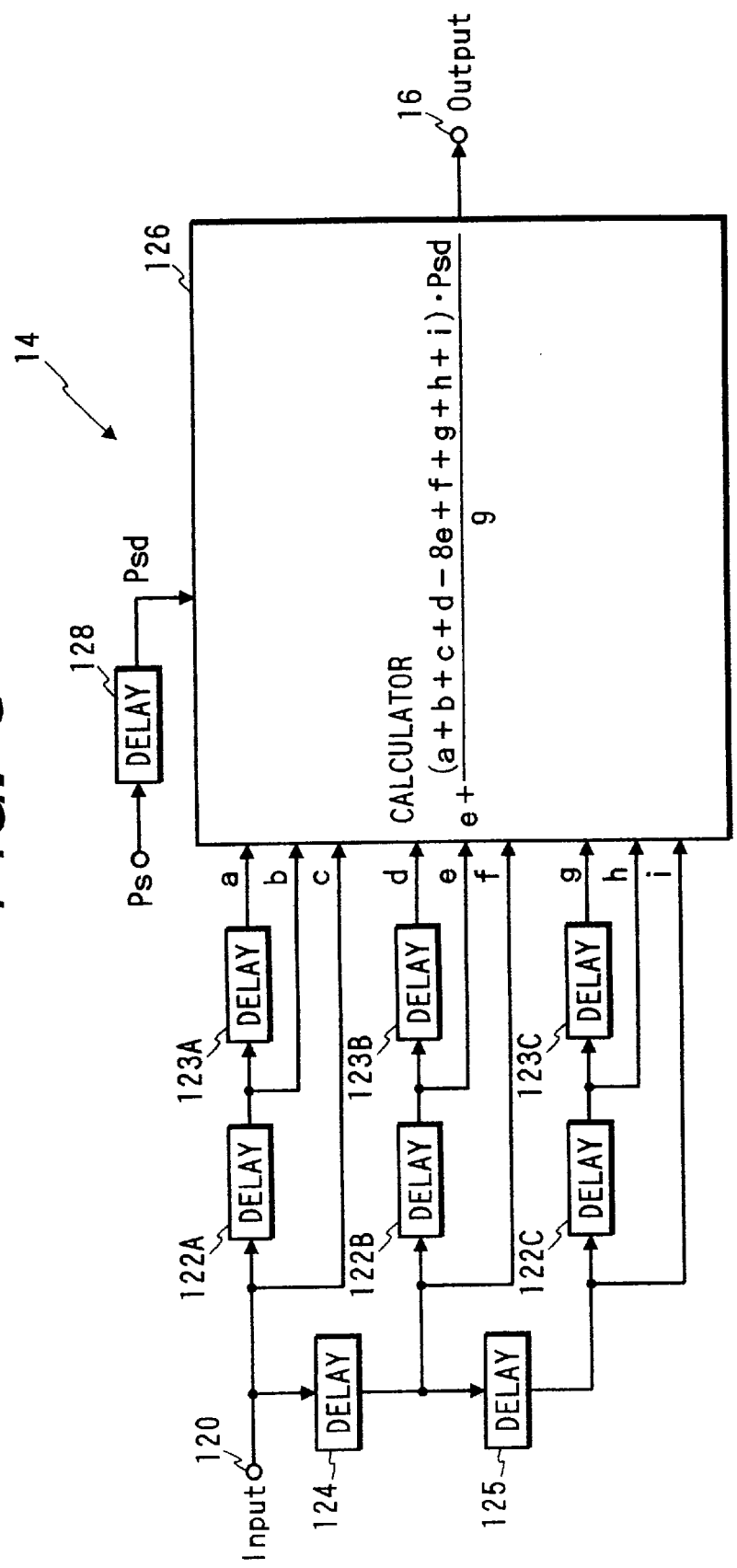
FIG. 8 is a block diagram of a spatial-direction low pass filter in FIG. 1.

FIG. 8 shows an example of the spatial-direction low pass filter 14. As shown in FIG. 8, the spatial-direction low pass filter 14 includes an input terminal 120, delay devices 122A, 122B, 122C, 123A, 123B, 123C, 124, 125, and 128, and a calculator 126.

In the spatial-direction low pass filter 14 of FIG. 8, the input terminal 120 receives the first filtering-resultant moving-picture signal from the temporal-direction low pass filter 13 (see FIG. 1). The first filtering-resultant moving-picture signal agrees with a signal "c" representing a value at the pixel "c" of FIG. 3. The signal "c" is applied to the delay devices 122A and 124 and the calculator 126.

The device 122A delays the signal "c" by a period corresponding to one pixel, and thereby changes the signal "c" into a delay-resultant signal "b". The signal "b" represents a value at the pixel "b" of FIG. 3. The delay device 122A outputs the signal "b" to the delay device 123A and the calculator 126. The device 123A delays the signal "b" by a period corresponding to one pixel, and thereby changes the signal "b" into a delay-resultant signal "a". The signal "a" represents a value at the pixel "a" of FIG. 3. The delay device 123A outputs the signal "a" to the calculator 126.

The device 124 delays the signal "c" by a period corresponding to one scanning line, and thereby changes the signal "c" into a delay-resultant signal "f". The signal "f" represents a value at the pixel "f" of FIG. 3. The delay device 124 outputs the signal "f" to the delay device 122B, the delay device 125, and the calculator 126. The device 122B delays the signal "f" by a period corresponding to one pixel, and thereby changes the signal "f" into a delay-resultant signal "e". The signal "e" represents a value at the pixel "e" of FIG. 3. The delay device 122B outputs the signal "e" to the delay device 123B and the calculator 126. The device 123B delays the signal "e" by a period corresponding to one pixel, and thereby changes the signal "e" into a delay-resultant signal "d". The signal "d" represents a value at the pixel "d" of FIG. 3. The delay device 123B outputs the signal "d" to the calculator 126.

The device 125 delays the signal "f" by a period corresponding to one scanning line, and thereby changes the signal "f" into a delay-resultant signal "i". The signal "i" represents a value at the pixel "i" of FIG. 3. The delay device 125 outputs the signal "i" to the delay device 122C and the calculator 126. The device 122C delays the signal "i" by a period corresponding to one pixel, and thereby changes the signal "i" into a delay-resultant signal "h". The signal "h" represents a value at the pixel "h" of FIG. 3. The delay device 122C outputs the signal "h" to the delay device 123C and the calculator 126. The device 123C delays the signal "h" by a period corresponding to one pixel, and thereby changes the signal "h" into a delay-resultant signal "g". The signal "g" represents a value at the pixel "g" of FIG. 3. The delay device 123C outputs the signal "g" to the calculator 126.

As shown in FIG. 3, the 3×3 neighboring pixels "a", "b", "c", "d", "e", "f", "g", "h", and "i" are defined in connection with the signals "a", "b", "c", "d", "e", "f", "g", "h", and "i" in the spatial-direction low pass filter 14 of FIG. 8, respectively. The central pixel "e" agrees with the pixel of interest or the pixel in question.

In the spatial-direction low pass filter 14 of FIG. 8, the delay device 128 receives the output signal of the parameter deciding device 15 which represents the band limit control parameter Ps. The device 128 delays the received signal by a period corresponding to the resultant of one scanning line and one pixel, and thereby changes the received signal into a delay-resultant signal which corresponds to the pixel "e" of interest. The delay device 128 outputs the delay resultant signal to the calculator 126. The band limit control parameter represented by the output signal of the delay device 128 is denoted by the character. "Psd".

The calculator 126 determines a filtering-result value Ss in response to the values "a", "b", "c", "d", "e", "f", "g", "h", and "i", and the band limit control parameter Psd according to the following equation.

$$Ss = e + \frac{(a+b+c+d-8e+f+g+h+i) \cdot Psd}{9}$$

This equation corresponds to a low pass filtering process in spatial directions. The degree of the low pass filtering process depends on the band limit control parameter Psd. The calculator 126 generates a signal representing the filtering-result value Ss. The signal representing the filtering-result value Ss is transmitted from the calculator 126 to the output terminal 16 as a second filtering-resultant moving-picture signal.

When the band limit control parameter Psd is equal to "0", the filtering-result value Ss is equal to the value "e". In this case, the spatial-direction low pass filter 14 is in a through state so that the first filtering-resultant moving-picture signal passes through the spatial-direction low pass filter 14 without undergoing any filtering process. When the band limit control parameter Psd is equal to "1", the filtering-result value Ss is equal to the value "(a+b+c+d+e+f+g+h+i)/9" which agrees with a mean among the values "a", "b", "c", "d", "e", "f", "g", "h", and "i". In this case, the spatial-direction low pass filter 14 fully executes a given low pass filtering process in spatial directions. When the band limit control parameter Psd is equal to a value between "0" and "1", the filtering-result value Ss is equal to a weighted mean among the values "a", "b", "c", "d", "e", "f", "g", "h", and "i". In this case, weighting coefficients for the values "a", "b", "c", "d", "e", "f", "g", "h", and "i" depend on the band limit control parameter Psd, and the spatial-direction low pass filter 14 executes the spatial-direction low pass filtering process at a degree depending on the band limit control parameter Psd.

A timing adjustment arrangement (not shown) including at least one delay device is provided so that the pixel corresponding to the moving-picture signal currently fed to the temporal-direction low pass filter 13 via the switch 3 will agree with the pixel corresponding to the signal currently fed to the parameter deciding device 15 from the memory 11. Further, the pixel corresponding to the first filtering-resultant moving-picture signal currently fed to the spatial low pass filter 14 from the temporal-direction low pass filter 13 agrees with the pixel corresponding to the signal currently fed to the parameter deciding device 15 from the memory 11.

In general, the band limiting apparatus of FIG. 1 is used as a pre-filter followed by a highly efficient encoding apparatus or a compressively encoding apparatus. As previously described, in the band limiting apparatus of FIG. 1, the motion-compensated predictive error signal is generated for every frame. The pixel-corresponding activity ACTp is calculated on the basis of the motion-compensated predictive error signal. The 1-frame activity accumulation value ACTf is calculated by summing the pixel-corresponding activities. Thus, detection is made as to temporal and spatial correlations in moving pictures for every local area within a frame region. The band limit control parameters Pt and Ps are determined in response to the pixel-corresponding activity ACTp and the 1-frame activity accumulation value ACTf. In other words, the band limit control parameters Pt and Ps are determined in accordance with the detected temporal and spatial correlations. Thus, the band limit control parameters Pt and Ps are controlled pixel by pixel as well as frame by frame in response to the detected temporal and spatial correlations. Accordingly, the temporal-direction low pass filtering process and the spatial-direction low pass filtering process on an input moving-picture signal by the temporal-direction low pass filter 13 and the spatial-direction low pass filter 14 are controlled pixel by pixel as well as frame by frame in response to the detected temporal and spatial correlations. In other words, the characteristics of limiting the band of the input moving-picture signal in temporal and spatial directions are controlled pixel by pixel as well as frame by frame in response to the detected temporal and spatial correlations. This operation of the band limiting apparatus of FIG. 1 enables a reduction in a picture-quality deterioration which would be caused by highly efficient encoding or compressively encoding.

In the band limiting apparatus of FIG. 1, the predictor 7 generates the motion-compensated predictive picture signal. Accordingly, a temporal redundancy in moving pictures which is generally removed by highly efficient encoding or compressively encoding is considered in determining the band limit control parameters Pt and Ps. Thus, it is possible to prevent the band of the input moving-picture signal from being needlessly limited under given signal conditions.

Second Embodiment

FIG. 9 shows a second embodiment of this invention which is similar to the embodiment of FIG. 1 except for design changes indicated hereinafter. The embodiment of FIG. 9 dispenses with the memory 11 of FIG. 1. In the embodiment of FIG. 9, a parameter deciding device 15 is directly connected to an activity calculator 10. Further, in the embodiment of FIG. 9, a latch 17 is interposed between an accumulator 12 and the parameter deciding device 15.

In the embodiment of FIG. 9, the device 10 calculates the activity of every pixel-corresponding segment of a second motion-compensated predictive error signal outputted from a memory 9. The activity calculator 10 outputs a signal representative of the calculated activity to the accumulator 12 and the parameter deciding device 15. The activity represented by the output signal of the activity calculator 10 is used by the parameter deciding device 15 as a pixel-corresponding activity ACTp.

In the embodiment of FIG. 9, the accumulator 12 outputs a signal representative of a 1-frame activity accumulation value ACTf to the latch 17. The device 17 periodically latches the output signal of the accumulator 12 at a timing determined by a frame sync signal. Specifically, the device 17 latches the output signal of the accumulator 12 immediately before the accumulation value calculated by the accumulator 12 is reset to "0". The latch 17 outputs the latched signal to the parameter deciding device 15 as a signal representing the 1-frame activity accumulation value ACTf. The 1-frame activity accumulation value ACTf represented by the output signal of the latch 17 is used by the parameter deciding device 15 in the calculation of band limit control parameters Pt and Ps for a frame immediately following the frame related to the 1-frame activity accumulation value ACTf (that is, the frame related to the output signal of the latch 17).

The embodiment of FIG. 9 is advantageous in that the memory 11 of FIG. 1 can be omitted.

What is claimed is:

1. An apparatus for limiting a band of a moving-picture signal, comprising:

first means (6, 7, 8) for generating a motion-compensated predictive error signal in response to the moving-picture signal for every frame related to the moving-picture signal;

an activity calculator (10) for calculating an activity for each of pixels composing the frame in response to the motion-compensated predictive error signal, and for outputting a first activity signal representing the calculated activity for each of pixels composing the frame;

an accumulator (12) receiving the output signal from the activity calculator (10) for accumulating the activities for the respective pixels composing the frame, which are represented by the first activity signal output from the activity calculator (10), to calculate a 1-frame activity accumulation value, and for outputting a second activity signal representing the calculated 1-frame activity accumulation value;

a temporal-direction filter (13);

a spatial-direction filter (14);

a parameter deciding device (11, 15) receiving the output signal from the activity calculator (10) and the output signal from the accumulator (12) for deciding a first band limit control parameter (Pt) for said temporal-direction filter (13) and a second band limit control parameter (Ps) for said spatial-direction filter (14) in response to the activity for each of pixels composing the frame which is represented by the first activity signal output from the activity calculator (10) and in response to the 1-frame activity accumulation value represented by the second activity signal output from the accumulator (12), and for outputting a first control signal representing the decided first band limit control parameter (Pt) and a second control signal representing the decided second band limit control parameter (Ps);

said temporal-direction filter (13) receiving the first control signal from the parameter deciding device (11, 15) for temporally limiting the band of the moving-picture signal in a temporal direction at a degree depending on the first band limit control parameter (Pt) represented by the first control signal; and said spatial-direction filter (14) receiving the second control signal from the parameter deciding device (11, 15)

for spatially limiting the band of the moving-picture signal in a spatial direction at a degree depending on the second band limit control parameter (Ps) represented by the second control signal;

wherein the first band limit control parameter (Pt) decided by the parameter deciding device (11, 15) causes said temporal-direction filter (13) to increase the degree of temporally limiting the band of the moving-picture signal as at least one of the 1-frame activity accumulation value and the activity for each of pixels composing the frame increases, and wherein the second band limit control parameter (Ps) decided by the parameter deciding device (11, 15) causes said spatial-direction filter (14) to increase the degree of spatially limiting the band of the moving-picture signal as at least one of the 1-frame activity accumulation value and the activity for each of pixels composing the frame increases.

2. Apparatus as recited in claim 1, further comprising:

first nullifying means for nullifying the degree of limiting the band of the moving-picture signal in the spatial direction when the calculated 1-frame activity accumulation value is equal to or smaller than a first given value; and second nullifying means for nullifying the degree of limiting the band of the moving-picture signal in the temporal direction when the calculated 1-frame activity accumulation value is equal to or smaller than a second given value.

3. An apparatus as recited in claim 1, wherein the temporal-direction filter (13) includes a temporal-direction low pass filter, and the spatial direction filter (14) includes a spatial-direction low pass filter.

4. A method of limiting a band of a moving-picture signal, comprising the steps of:

generating a motion-compensated predictive error signal in response to the moving-picture signal for every frame related to the moving-picture signal;

calculating an activity for each of pixels composing the frame in response to the motion-compensated predictive error signal, and outputting a first activity signal representing the calculated activity for each of pixels composing the frame;

accumulating the activities for the respective pixels composing the frame, which are represented by the first activity signal to calculate a 1-frame activity accumulation value, and outputting a second activity signal representing the calculated 1-frame activity accumulation value;

deciding a first band limit control parameter (Pt) for a temporal-direction filter and a second band limit control parameter (Ps) for a spatial-direction filter in response to the activity for each of pixels composing the frame which is represented by the first activity signal and in response to the 1-frame activity accumulation value represented by the second activity signal, and outputting a first control signal representing the decided first band limit control parameter (Pt) and a second control signal representing the decided second band limit control parameter (Ps);

temporally limiting the band of the moving-picture signal in a temporal direction at a degree depending on the first band limit control parameter (Pt) represented by the first control signal; and spatially limiting the band of the moving-picture signal in a spatial direction at a degree depending on the second band limit control parameter (Ps) represented by the second control signal;

wherein the first band limit control parameter (Pt) decided in the parameter deciding step causes the degree of temporally limiting the band of the moving-picture signal to increase as at least one of the 1-frame activity accumulation value and the activity for each of pixels composing the frame increases, and wherein the second band limit control parameter (Ps) decided in the parameter deciding step causes the degree of spatially limiting the band of the moving-picture signal to increase as at least one of the 1-frame activity accumulation value and the activity for each of pixels composing the frame increases.

5. A method as recited in claim 4, further comprising the steps of:

nullifying the degree of limiting the band of the moving-picture signal in the spatial direction when the calculated 1-frame activity accumulation value is equal to or smaller than a first given value; and nullifying the degree of limiting the band of the moving-picture signal in the temporal direction when the calculated 1-frame activity accumulation value is equal to or smaller than a second given value.

* * * * *